US010091630B2

(12) United States Patent
Yae

(10) Patent No.: US 10,091,630 B2
(45) Date of Patent: Oct. 2, 2018

(54) METHOD AND APPARATUS FOR RESOLVING BLUETOOTH COMPATIBILITY PROBLEM

(71) Applicant: Hyundai Motor Company, Seoul (KR)

(72) Inventor: Seong Soo Yae, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 1 day.

(21) Appl. No.: 15/052,230

(22) Filed: Feb. 24, 2016

(65) Prior Publication Data

US 2017/0118573 A1    Apr. 27, 2017

(30) Foreign Application Priority Data

Oct. 26, 2015 (KR) .......................... 10-2015-0148867

(51) Int. Cl.
*H04W 4/50* (2018.01)
*H04W 4/80* (2018.01)
(Continued)

(52) U.S. Cl.
CPC .............. *H04W 4/50* (2018.02); *H04L 67/34* (2013.01); *H04M 1/7253* (2013.01); *H04W 4/001* (2013.01); *H04W 4/008* (2013.01); *H04W 4/046* (2013.01); *H04W 4/80* (2018.02); *H04W 24/08* (2013.01); *H04M 1/6091* (2013.01); *H04M 2250/02* (2013.01)

(58) Field of Classification Search
CPC . G06F 11/00; G06F 9/44; G06F 11/30; G06F 21/00; H04W 4/001; H04W 4/50; H04W 4/80; H04W 4/046; H04W 24/08; H04M 1/7253; H04M 2250/02; H04M 1/6091; H04L 67/34
See application file for complete search history.

(56) References Cited

U.S. PATENT DOCUMENTS

2006/0234632 A1* 10/2006 Lin ........................ H04W 8/245
455/41.2
2013/0309977 A1* 11/2013 Heines ...................... G06F 8/70
455/67.7
(Continued)

FOREIGN PATENT DOCUMENTS

JP     2014-041456 A     3/2014
JP     2014041456 A  *  3/2014 ............... G06F 8/65
(Continued)

Primary Examiner — Dong-Chang Shiue
(74) Attorney, Agent, or Firm — Mintz Levin Cohn Ferris Glovsky and Popeo, P.C.; Peter F. Corless

(57) ABSTRACT

A method for resolving a Bluetooth compatibility problem is disclosed includes: Bluetooth-connecting with a user device during power supply; generating a packet including vehicle error information for identification of a type of error detected during Bluetooth communication with the user device and vehicle device information for identification of the vehicle Bluetooth device, upon detecting the error during the Bluetooth communication with the user device; transmitting the packet to a compatibility management server or the user device; receiving a software or firmware version to be updated based on the vehicle error information and the vehicle device information from the compatibility management server; and installing the software or firmware version.

13 Claims, 5 Drawing Sheets

(51) Int. Cl.
*H04L 29/08* (2006.01)
*H04M 1/725* (2006.01)
*H04W 4/00* (2018.01)
*H04W 24/08* (2009.01)
*H04W 4/04* (2009.01)
*H04M 1/60* (2006.01)

(56) References Cited

U.S. PATENT DOCUMENTS

| | | | | |
|---|---|---|---|---|
| 2014/0325113 | A1* | 10/2014 | Frye | G06F 13/00 |
| | | | | 710/304 |
| 2015/0207689 | A1* | 7/2015 | Matsumoto | H04L 41/12 |
| | | | | 709/223 |
| 2015/0309859 | A1* | 10/2015 | Elzein | H04L 41/0873 |
| | | | | 714/49 |

FOREIGN PATENT DOCUMENTS

| | | |
|---|---|---|
| JP | 2015-144381 A | 8/2015 |
| KR | 2012-0071243 A | 7/2012 |
| KR | 10-1231933 B1 | 2/2013 |
| KR | 10-2014-0057923 A | 5/2014 |
| KR | 2014-0146718 A | 12/2014 |

* cited by examiner

METHOD AND APPARATUS FOR RESOLVING BLUETOOTH COMPATIBILITY PROBLEM

CROSS-REFERENCE TO RELATED APPLICATION

This application claims the benefit of and priority to Korean Patent Application No. 10-2015-0148867, filed on Oct. 26, 2015, which is hereby incorporated by reference as if fully set forth herein.

BACKGROUND OF THE DISCLOSURE

Technical Field

The present disclosure relates generally to vehicle Bluetooth communication, and more particularly, to a method and apparatus for resolving a Bluetooth compatibility problem, for adaptively resolving a Bluetooth compatibility problem that arises between a vehicle head unit (H/U) with a Bluetooth function and a user device Bluetooth-paired with the vehicle H/U.

Discussion of the Related Art

The recent development of information technology (IT) has affected the automobile industry, whereby various IT has been combined with vehicles, in accordance with current trends. In particular, vehicle pairing technologies for providing various services in conjunction with a communication device, such as a smartphone, have drawn attention.

In general, a head unit (H/U) with a Bluetooth hands-free function, etc. can be configured in such a way that a Bluetooth function is automatically turned on to enter a pairing standby status when the vehicle is turned on, such that a driver performs a pairing operation by selecting a predetermined menu in the vehicle H/U and a user's smartphone. In this case, when the pairing operation and Bluetooth communication connection are completed, the driver can use Bluetooth hands-free calling.

However, as user device types paired with a vehicle H/U and user device operating systems (Oss) have diversified, and Bluetooth related software has been frequently updated, it becomes been difficult to maintain compatibility between the vehicle H/U and a user device. Accordingly, company research laboratories and original equipment manufacturers (OEMs) have actively conducted research into reasons and solutions of the generated Bluetooth compatibility problem, but such problems cannot always be addressed in a timely manner, and customer satisfaction cannot be guaranteed.

In the case of conventional Bluetooth compatibility updates in North America, new update procedures have been performed according to a fatal error or according to a periodic update event. On the other hand, in Korea, China, Europe, and so on, periodic update procedures are not performed, and thus, user dissatisfaction with vehicle Bluetooth services has increased.

SUMMARY OF THE DISCLOSURE

Accordingly, the present disclosure is directed to a method and apparatus for resolving a Bluetooth compatibility problem that substantially obviates one or more problems due to limitations and disadvantages of the related art.

An object of the present disclosure is to provide a method and apparatus for resolving a Bluetooth compatibility problem. Another object of the present disclosure is to provide a method and apparatus for resolving a Bluetooth compatibility problem, for enabling real-time correspondence according to reason analysis by transmitting information about a detected Bluetooth compatibility problem to a server in real-time through a vehicle H/U or a user device when the Bluetooth compatibility problem in a vehicle is detected.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method for resolving a Bluetooth compatibility problem in a vehicle Bluetooth device includes: Bluetooth-connecting with a user device during power supply; generating a packet including vehicle error information for identification of a type of error detected during Bluetooth communication with the user device and vehicle device information for identification of the vehicle Bluetooth device, upon detecting the error during the Bluetooth communication with the user device; transmitting the packet to a compatibility management server or the user device; receiving a software or firmware version to be updated based on the vehicle error information and the vehicle device information from the compatibility management server; and installing the software or firmware version.

The Bluetooth-connecting may include: Bluetooth-pairing with the user device; establishing a Bluetooth communication session with the user device when the Bluetooth pairing is successful; and identifying the detected error according to the error type.

The method may further include: checking whether a mobile communication modem is installed in the vehicle Bluetooth device; and transmitting the packet to the compatibility management server when the mobile communication modem is installed.

The method may further include: transmitting the packet to the user device when the mobile communication modem is not installed.

The method may further include: transmitting the packet to the user device using a predetermined Bluetooth communication protocol without a Bluetooth compatibility problem when the packet is transmitted to the user device.

The predetermined Bluetooth communication protocol without a Bluetooth compatibility problem may be any one of a serial port profile and an object exchange profile.

The method may further include: mapping the vehicle error information and the vehicle device information to a device information service packet format defined in Bluetooth standard when the packet is transmitted to the user device.

The method may further include: monitoring a Bluetooth operation when the error is not detected during the Bluetooth-connecting. When an error is detected during the monitoring of the Bluetooth operation, vehicle error information including an error type corresponding to a currently proceeding service or profile and the vehicle device information may be transmitted to the compatibility management server or the user device.

When the Bluetooth connection established with the user device is abnormally released during the monitoring of the Bluetooth operation, the vehicle error information formed by setting the error type as connection release and the vehicle device information may be transmitted to the compatibility management server or the user device.

Furthermore, according to embodiments of the present disclosure, a method for resolving a Bluetooth compatibility problem in a user device for performing Bluetooth communication in conjunction with a vehicle Bluetooth device includes: Bluetooth-connecting with the vehicle Bluetooth device; generating a packet including user error information for identification of a type of error detected during Bluetooth communication with the user device and user device information for identification of the user device, upon detecting the error during the Bluetooth communication with the vehicle Bluetooth device; transmitting the packet to a compatibility management server or the vehicle Bluetooth device; receiving a software or firmware version to be updated based on the vehicle error information and the user device information from the compatibility management server; and installing the software or firmware version.

The Bluetooth-connecting may include: Bluetooth-pairing with the vehicle Bluetooth device; establishing a Bluetooth communication session with the vehicle Bluetooth device; and identifying the detected error according to the error type.

The method may further include: transmitting the packet to the compatibility management server when vehicle error information and vehicle device information are received from the vehicle Bluetooth device within a predetermined time period after detection of the error. The packet may further include the received vehicle error information and vehicle device information.

The method may further include: transmitting the packet including only the user error information and the user device information to the vehicle Bluetooth device when vehicle error information and vehicle device information are not received from the vehicle Bluetooth device within a predetermined time period after detection of the error.

The method may further include: transmitting the packet to the vehicle Bluetooth device using a predetermined Bluetooth communication protocol without a Bluetooth compatibility problem when the packet is transmitted to the vehicle Bluetooth device.

The predetermined Bluetooth communication protocol without a Bluetooth compatibility problem may be any one of a serial port profile and an object exchange profile.

The method may further include: mapping the vehicle error information and the vehicle device information to a device information service packet format defined in Bluetooth standard when the packet is transmitted to the vehicle Bluetooth device.

The method may further include: transmitting the packet to the vehicle Bluetooth device using a predetermined Bluetooth communication protocol without a Bluetooth compatibility problem when the packet is transmitted to the vehicle Bluetooth device.

When the Bluetooth connection established with the vehicle Bluetooth device is abnormally released during the monitoring of the Bluetooth operation, the user error information formed by setting the error type as connection release and the vehicle device information may be transmitted to the compatibility management server or the user device.

Furthermore, according to embodiments of the present disclosure, a vehicle Bluetooth device for performing Bluetooth communication with a user device includes: a Bluetooth module Bluetooth-communicating with the user device; a mobile communication module communicating with a compatibility management server through a wireless communication network; and a compatibility diagnosis module performing control to generate a packet including vehicle error information for identification of a type of error detected during Bluetooth communication with the user device and vehicle device information for identification of the vehicle Bluetooth device, upon detecting the error during the Bluetooth communication with the user device, and transmitting the generated packet to a compatibility management server or the user device based on whether the mobile communication module is activated. The compatibility diagnosis module receives a software or firmware version to be updated based on the vehicle error information and the vehicle device information from the compatibility management server or the user device and installs the software or firmware version.

Furthermore, according to embodiments of the present disclosure, a user device for performing Bluetooth communication in conjunction with a vehicle Bluetooth device includes: a Bluetooth module Bluetooth-communicating with the vehicle Bluetooth device; a mobile communication module communicating with a compatibility management server through a wireless communication network; and a compatibility management app performing control to generate a packet including user error information for identification of a type of error detected during Bluetooth communication with the user device and user device information for identification of the user device, upon detecting error during Bluetooth communication with the vehicle Bluetooth device, and transmitting the generated packet to the compatibility management server through the mobile communication module or to the vehicle Bluetooth device through the Bluetooth module, wherein the compatibility management app receives a software or firmware version to be updated based on the vehicle error information and the user device information from the compatibility management server and installs the software or firmware version.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
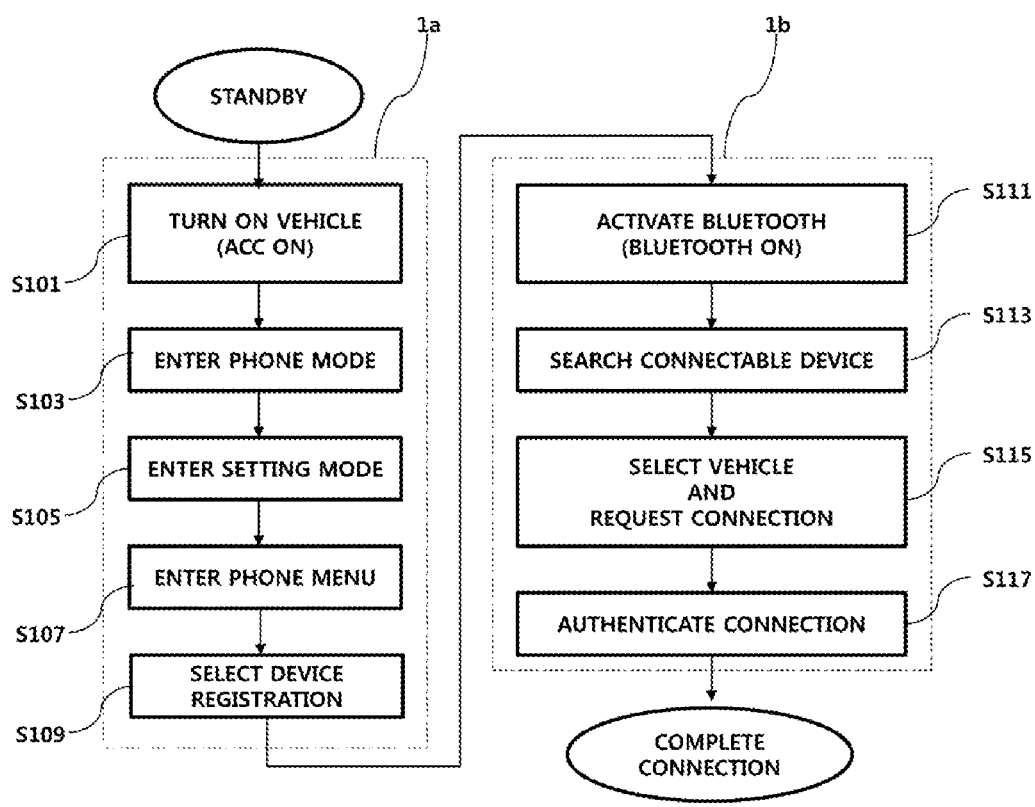
FIG. 1 is a diagram for explanation of a general Bluetooth pairing procedure in a vehicle.

Reference will now be made in detail to the embodiments of the present disclosure, examples of which are illustrated in the accompanying drawings. As those skilled in the art would realize, the described embodiments may be modified in various different ways, all without departing from the spirit or scope of the present disclosure. Further, throughout the specification, like reference numerals refer to like elements.

Although all elements constituting the embodiments of the present disclosure are described as integrated into a single one or to be operated as a single one, the present disclosure is not necessarily limited to such embodiments. According to embodiments, all of the elements may be selectively integrated into one or more and be operated as one or more within the object and the scope of the present disclosure. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily understood by those skilled in the art to which the present disclosure pertains. The computer program may be stored in computer readable media such that the computer program is read and executed by a computer to implement embodiments of the present disclosure. Computer program storage media may include magnetic recording media, optical recording media, and carrier wave media.

The suffixes "module" and "unit" of elements herein are used for convenience of description and thus can be used interchangeably and do not have any distinguishable meanings or functions. The term "comprises", "includes", or "has" described herein should be interpreted not to exclude other elements but to further include such other elements since the corresponding elements may be included unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless differently defined in the present disclosure, such terms should not be interpreted in an ideal or excessively formal manner.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one processor specifically programmed to execute program instructions stored in a memory to perform one or more processes which are described further below. Moreover, it is understood that the below methods may be executed by an apparatus comprising the processor and/or memory in conjunction with one or more other components, as would be appreciated by a person of ordinary skill in the art.

Furthermore, the processor of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, a conventional Bluetooth pairing procedure in a vehicle will be schematically described with reference to FIGS. 1 and 2.

FIG. 1 is a diagram for explanation of a general Bluetooth pairing procedure in a vehicle.

Reference numeral 1a may refer to a Bluetooth pairing procedure performed by a vehicle head unit (H/U) and reference numeral 1b may refer to a Bluetooth pairing procedure performed by a user device.

Referring to reference numeral 1a, when a user turns on a vehicle to supply power to the vehicle, i.e., ACC ON, when a vehicle system is prepared, a vehicle head unit (H/U) initiates an automatic Bluetooth pairing procedure. In this case, the vehicle H/U may enter a phone mode and attempt pairing with a predetermined or preregistered user device, e.g., a driver smartphone, (S101 to S103). In addition, display screen of the vehicle H/U may be configured to display a predetermined user interface image showing that connection with a specific device is being attempted.

When a pairing procedure, which is automatically performed after the vehicle is turned on, is canceled by a user, the vehicle H/U may sequentially enter a setting menu and a phone menu to register a new user device or may configure and display a predetermined user interface image-hereinafter, referred to as "device registration selection image" for convenience of description-containing a menu for selection of any one of preregistered user devices (S105 to S109). In this case, the user may determine a user device as a pairing target according to menu selection on the device registration selection image. In addition, the display screen of the vehicle H/U may display a predetermined guide message for requesting activation of a Bluetooth function of a user device as a connection target.

Referring to reference numeral 1b, according to the guide message displayed on the screen of the user vehicle H/U, the Bluetooth function may be activated (S111).

When the Bluetooth function of the user device is activated by the user, the user device may search for peripheral devices to be Bluetooth paired and display the search result on the screen (S113).

As the search result, when a user's vehicle is selected by the user on the screen, the user device may transmit a connection request signal to the selected vehicle (S115). In this case, the user device screen may display a predetermined private key input image for receiving a private key value corresponding to the selected vehicle.

Continuously, upon receiving a connection request signal from the user device, the vehicle H/U may display vehicle information and the private key value on the screen.

The user device may receive a private key value on the private key input image and transmit the value to the vehicle H/U, and in this case, when the received private key value corresponds to a private key value of the vehicle H/U, the vehicle H/U may transmit a predetermined authentication complete message indicating that connection request authentication is completed to the user device (S117).

Figure 2:
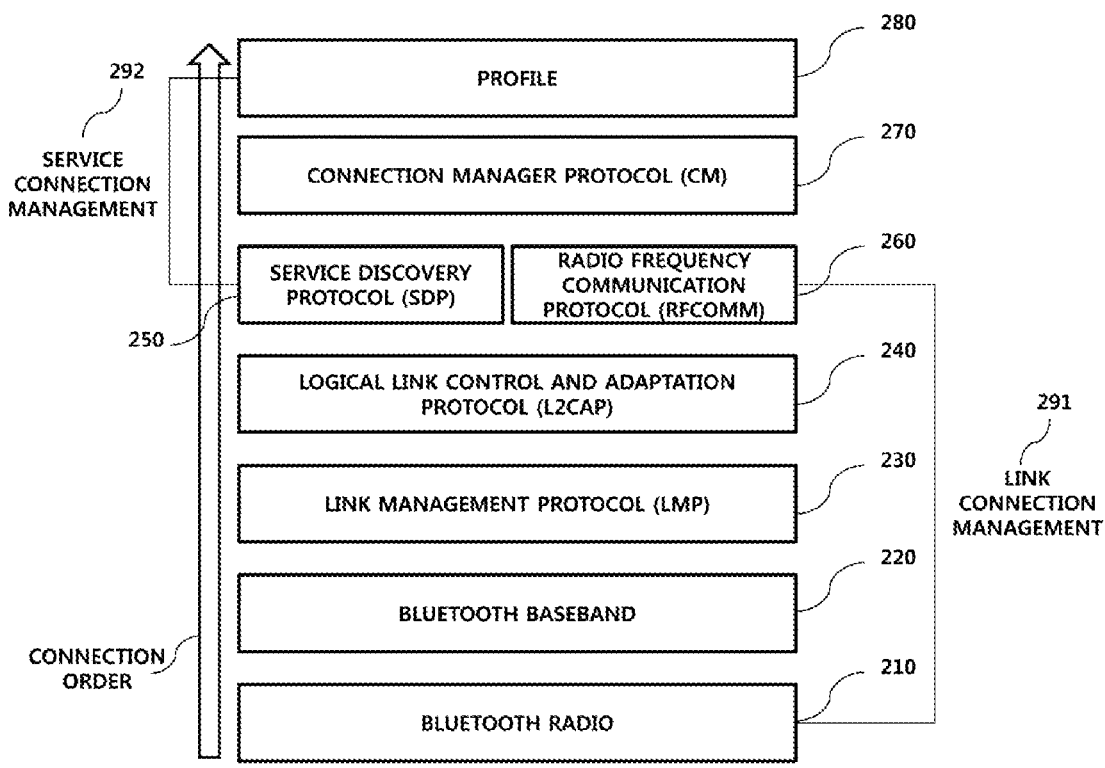
FIG. 2 is a diagram for explanation of a Bluetooth protocol stack for Bluetooth vehicle communication, according to the present disclosure.

FIG. 2 is a diagram for explanation of a Bluetooth protocol stack for Bluetooth vehicle communication, according to the present disclosure.

As shown in FIG. 2, the Bluetooth protocol stack may include a Bluetooth radio 210 layer, a Bluetooth baseband 220 layer, a link management protocol (LMP) 230 layer, a logical link control and adaptation protocol (L2CAP) 240 layer, a service discovery protocol (SDP) 250 layer, a radio frequency communication protocol (RFCOMM) 260 layer, a connection manager 270 layer, and a profile 280 layer. All these layers for constituting the Bluetooth stack are not required and thus it is noted that greater or fewer layers of the protocol stack than in FIG. 2 may constitute the protocol stack.

The Bluetooth radio 210 layer may convert a radio signal in an industrial scientific and medical (ISM) frequency band of 2400 to 2483.5 MHz into a baseband and forward the converted signal to the Bluetooth baseband 220 layer through an antenna included in the Bluetooth radio 210 layer or may convert a baseband signal received from the Bluetooth baseband 220 into an ISM frequency band and may wirelessly transmit the converted signal.

The Bluetooth baseband 220 layer may modulate data received from a higher layer and forward the modulated data to the Bluetooth radio 210 layer or may demodulate the baseband signal received from the Bluetooth radio 210 layer and forward the demodulated signal to a higher layer. In this case, a modulation scheme may be, for example, frequency shift keying (FSK), phase shift keying (PSK), quadrature amplitude modulation (QAM), or the like.

The LMP 230 layer may be software corresponding to a firmware level which directly controls baseband hardware and may perform a piconet management function, a link management function, an encryption management function, or the like.

Here, the piconet management function may include a connection and connection release management function with a slave device, a function switch function between a master device and a slave device, an asynchronous connectionless link (ACL) and synchronous connection orient (SCO) connection function, a power mode management function, and so on. Here, the ACL may be one of Bluetooth data links and may be operated in an asynchronous manner with regard to packet exchange between two devices. Accordingly, the ACL may be used in general data communication connection except for a voice channel. On the other hand, the SCO may be a link used for synchronous data transmission and may be mainly used in voice communication.

The link management function may include a function of managing service quality associated with a data transfer rate and an error rate in a network, a power control function, and so on.

The encryption management function may include a function associated with authentication and encryption.

The L2CAP 240 layer may be connected to the Bluetooth baseband 220 layer and may provide a logical channel for a higher layer. Here, the logical channel may refer to a virtual channel that is set in order to forward data forwarded from a higher layer or application layer of the L2CAP 240 layer to forward data forwarded from a lower layer to a higher layer. In particular, the L2CAP 240 layer may be responsible for functions of multiplexing and demultiplexing, segmentation and reassembly of data transmitted and received between the higher layer and the Bluetooth baseband 220 layer, and so on.

The SDP 250 layer may be a layer that provides a protocol for exchanging information about a service capable of being performed by a Bluetooth device connected to the SDP 250 layer and the characteristics of the available service and may be operated with a server-client structure. In this case, a universally unique identifier (UUID) may be allocated to each service, and a server device may maintain a list of available services and details of each service as a database. A client device may request and acquire information associated with the corresponding service to the server.

The RFCOMM 260 layer may emulate a RS-232 9 pin serial port based on TS 07.10 of European telecommunications standards institute (ETSI). The RFCOMM 260 layer may be used in the following two types of devices. One of these may be "Type1 Device" that is connected directly via a Bluetooth link by using two devices as ends of communications and the other one may be "Type2 Device" that is a portion of another network.

The connection manager 270 layer may be software of the vehicle H/U that manages connection for each profile (service).

The profile 280 layer may be a layer that maintains and manages detailed information about various services provided through Bluetooth communications. For example, a profile (e.g., service) that can be provided through Bluetooth communication may include a headset profile, a LAN access profile, a file transfer profile, a hands-free telephony profile, a phone book access profile (PBAP), a serial port profile (SPP), an object exchange (OBEX) profile, an advanced audio distribution profile (A2DP), an audio video remote control profile (AVRCP), a health device profile (HDP), a device ID profile (DIP), an attribute profile (ATT), a basic imaging profile (BIP), a basic printing profile (BPP), a fax profile (FAX), and so on.

In particular, compared with other Bluetooth profiles, the SPP or the OBEX may be a Bluetooth communication profile that is less affected by compatibility between devices and may be used as a communication element for exchange of error information, device information, and so on, which are detected when a Bluetooth compatibility problem, between Bluetooth devices.

For example, the error information may include error type information for identification of an error type, time information for identification of a time point of detection of error, and so on. Here, the error type may include, but is not limited to, pairing failure, connection failure, H/Free error, A2DP error, AVRCP error, PBAP error, connection release, and so on, and it is noted that the error type may include various errors that occur during execution of the aforementioned profile.

In addition, device information according to an embodiment of the present disclosure may include at least one of vehicle number (or device identifier) information, manufacturer identification information, model name information, operating system/application software/firmware version information of a corresponding device, IP information allocated to the corresponding device, and subscriber identification information.

Referring to FIG. 2, when a new device for Bluetooth communications is registered, two connection management procedures may be performed. One of these may be a link connection management 291 procedure and the other one may be a service connection management 292 procedure.

The link connection management 291 may be performed between the Bluetooth radio 210 layer and the SDP 250 layer and the service connection management 292 may be performed between the SDP 250 layer and the profile 280 layer.

As seen from FIG. 2, Bluetooth-connection may be performed by sequentially performing the link connection management 291 procedure and the service connection management 292 procedure.

For example, upon receiving a connection (e.g., service) request message from a user device during the link connection management 291 according to a new device registration request, the vehicle H/U may perform control to reject the connection (e.g., service) request message and not to perform a connection procedure corresponding to the corresponding service request any longer. When the vehicle H/U does not receive the connection request message during the link connection management 291 for registration of a new device, the vehicle H/U may release preset Bluetooth communication connection. Here, the Bluetooth communication connection includes link connection and service connection. Here, the link connection may be performed via message communications among the aforementioned LMP 230 layer, the L2CAP 240 layer, and the SDP 250 layer.

In addition, the vehicle H/U may perform access to each service retrieved by the SDP 250 in a predetermined order for service access. In this case, the vehicle H/U may store a connection order of corresponding services and monitor a connection request from a user device. As the monitoring result, upon receiving a request for new device registration by a user, the vehicle H/U may complete only a connection procedure for a currently performed service and then release all services that have been accessed so far. Then upon receiving access request from another user device, the vehicle H/U may perform control to disregard the corresponding access request and to initiate the new device registration procedure requested by the user.

Figure 3:
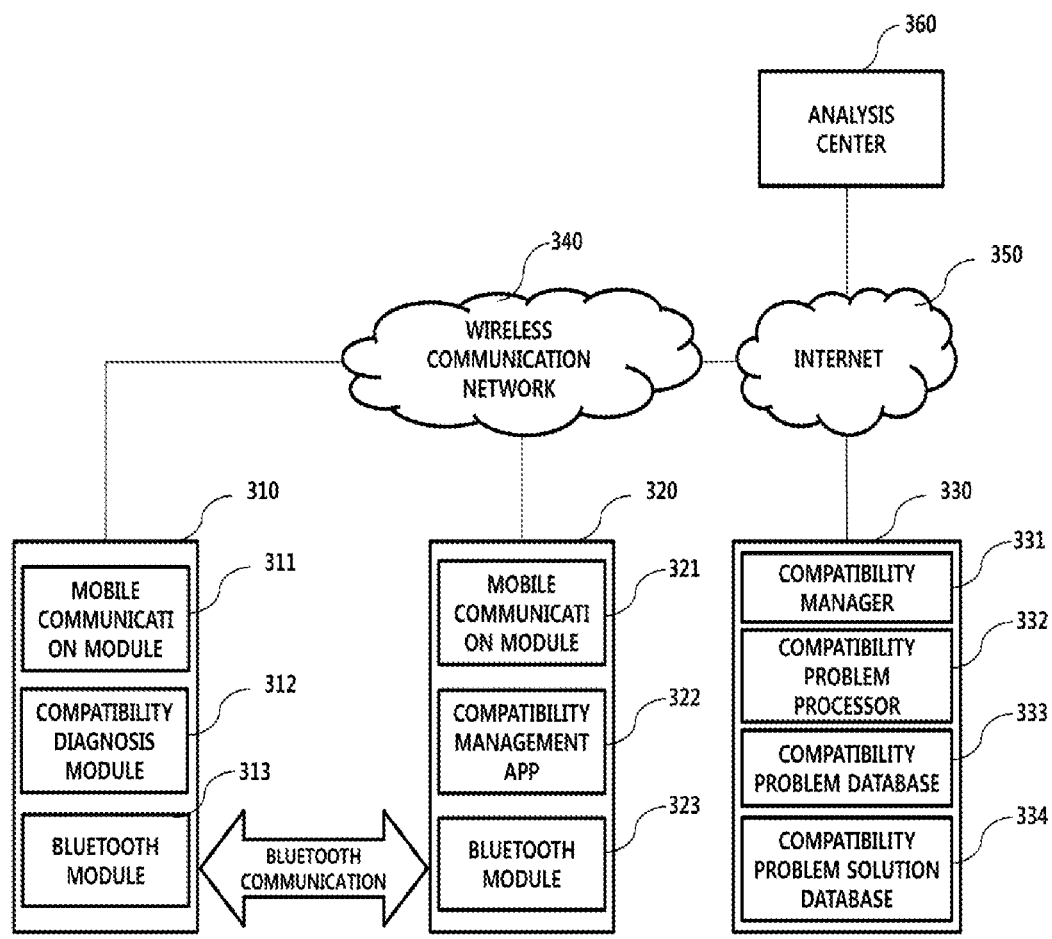
FIG. 3 is a diagram illustrating a structure of a system for resolving a Bluetooth compatibility problem, according to embodiments of the present disclosure.

FIG. 3 is a diagram illustrating a structure of a system for resolving a Bluetooth compatibility problem, according to embodiments of the present disclosure.

As shown in FIG. 3, the system for resolving the Bluetooth compatibility problem may be configured to largely include a vehicle Bluetooth device 310, a user device 320, and a compatibility management server 330. For example, the vehicle Bluetooth device 310 may be configured to be included in the vehicle H/U, but which is merely an embodiment of the present disclosure, and it is noted that the vehicle Bluetooth device 310 is configured as a separate device and installed in a vehicle.

The user device 320 may include, but is not limited to, a smartphone, a laptop computer, a wearable device, or the like, and may be any device as long as the user device 320 can Bluetooth-communicate with the vehicle Bluetooth device 310. For the purposes of the present disclosure, "Bluetooth-communicate" refers to establishing a Bluetooth communication session and/or communicating using Bluetooth techniques between two or more Bluetooth-enabled devices.

The vehicle Bluetooth device 310 may be configured to include at least one of a mobile communication module 311, a compatibility diagnosis module 312, and a Bluetooth module 313.

The compatibility diagnosis module 312 may perform control to identify a type of error that occurs during Bluetooth communications in conjunction with the Bluetooth module 313 and to transmit vehicle error information including the identified error type and vehicle device information to the compatibility management server 330 through the activated mobile communication module 311.

When the mobile communication module 311 is not installed or the installed mobile communication module 311 is not activated, the compatibility diagnosis module 312 may perform control to transmit vehicle error information and vehicle device information to the user device 320 through a predetermined Bluetooth communication protocol, e.g., SPP or OBEX. In particular, when the mobile communication module 311 is activated, the compatibility diagnosis module 312 may collect user error information and user device information that are received from the user device 320 together with the vehicle error information and vehicle device information that are detected by the compatibility diagnosis module 312 and then may also transmit a predetermined packet including the collected error information and device information to the compatibility management server 330 through a wireless communication network 340.

According to embodiments of the present disclosure, the vehicle Bluetooth device 310 and the user device 320 may use the following GATT based device information service (DIS) packet that is defined in Bluetooth standard for transmission and reception of the error information and the device information.

The DIS packet may be configured to include, for instance, a manufacturer name string packet for recording a name of a manufacturer of a corresponding device, a model number string field for recording a model number allocated to the corresponding device, a serial number string field for recording a unique number for uniquely identifying the corresponding device, a hardware revision string field for identifying a hardware version installed in the corresponding device, a software revision string field for identifying a software version installed in the corresponding device, a firmware revision string field for identification of a firmware version installed in the corresponding device, a system ID field including an organization unique identifier (OUI), an IEEE 11073-20601 regulatory certification data list field for recording standard defined in IEEE 11073-20601 and an authentication data list, and so on.

According to embodiments of the present disclosure, vehicle device information or user device information may be mapped to a field defined in the DIS packet. For example, the manufacturer name string field may be recorded with a vehicle manufacturer name or a user device manufacturer name. As another example, the model number string field may be recorded with a vehicle model name or a user device model name. As another example, the serial number string field may be recorded with a vehicle number or a user device serial number. As another example, the IEEE 11073-20601 regulatory certification data list field may be recorded with error type and the system ID field may be recorded with time information for detection of corresponding error.

The user device 320 may be configured to include at least one of a mobile communication module 321, a compatibility management app 322, and a Bluetooth module 323.

Here, the mobile communication module 321 may provide at least one function of wideband code division multiple access (WCDMA), code division multiple access (CDMA), long term evolution (LTE)/LTE-Advanced, and Wi-Fi.

The vehicle Bluetooth device 310 and the user device 320 may perform Bluetooth communication through each of the Bluetooth modules 313 and 323 that are included in the vehicle Bluetooth device 310 and the user device 320, respectively.

Upon detecting error during Bluetooth communications, the vehicle Bluetooth device 310 may transmit the detected error information and information about a device in which the corresponding error occurs to the compatibility management server 330 through the wireless communication network 340 and the Internet 350 using the mobile communication module 311. Here, the device information may include user device information about the user device 320 as well as vehicle device information about the vehicle Bluetooth device 310. Upon detecting error occurrence during Bluetooth communication with the user device 320, the vehicle Bluetooth device 310 may acquire the error information detected by the user device 320 and information about the user device 320 using a predetermined Bluetooth communication protocol, e.g., SPP or OBEX.

When the mobile communication module 311 is not installed in the vehicle Bluetooth device 310 or the installed mobile communication module 311 is not activated, that is, when communication with the compatibility management server 330 through the wireless communication network 340 is not possible, the vehicle Bluetooth device 310 may transmit the detected error information and the device information of the vehicle Bluetooth device 310 to the user device 320 through a predetermined Bluetooth profile, e.g., SPP or OBEX. In this case, the user device 320 may transmit error information that is internally detected using the mobile communication module 321 included in the user device 320 and/or error information received from the vehicle Bluetooth device 310, and information about the vehicle Bluetooth device 310 and a device of the user device 320 to the compatibility management server 330 through the wireless communication network 340 and the Internet 350.

For example, when error is detected by the Bluetooth module 323, the compatibility management app 322 may store the detected error information and device information for a predetermined recording region and then, when error device and device information are not received from the vehicle Bluetooth device 310 for a predetermined time period, the compatibility management app 322 may transmit the pre-stored error information and device information to the vehicle Bluetooth device 310 using a Bluetooth communication protocol such as SPP or OBEX. On the other hand, upon receiving error information and device information from the vehicle Bluetooth device 310 within a predetermined time period, the compatibility management app 322 may transmit the error information and device information received from the vehicle Bluetooth device 310 as well as pre-detected and stored error information and device information of the compatibility management app 322 to the compatibility management server 330 through the mobile communication module 321 included in the compatibility management app 322.

Hereinafter, for convenience of description, device information corresponding to the vehicle Bluetooth device 310 may be referred to as vehicle device information and device information corresponding to the user device 320 may be referred to as user device information. In addition, Bluetooth error information detected by the vehicle Bluetooth device 310 may be referred to as vehicle error information and Bluetooth error information detected by the user device 320 may be referred to as user device error information.

According to embodiments of the present disclosure, when the vehicle error information and the user device error information are the same, only one error information item may be transmitted to the compatibility management server 330. Furthermore, the vehicle Bluetooth device 310 and the user device 320 may detect error that occurs during Bluetooth communication in any one of layers of reference numbers 230 to 280 of FIG. 2.

The compatibility management server 330 may be configured to include a compatibility manager 331, a compatibility problem processor 332, a compatibility problem database 333, and a compatibility problem solution database 334.

The compatibility manager 331 may establish a communication session with the vehicle Bluetooth device 310 or the user device 320 and receive error information and device information through the established session.

In addition, the compatibility manager 331 may provide the received error information and device information to the compatibility problem processor 332.

When a software and/or firmware version to be updated corresponding to the detected error is present in the compatibility problem solution database 334, the compatibility manager 331 may immediately transmit the corresponding software and/or firmware as the corresponding update target to the vehicle Bluetooth device 310 and/or the user device 320 through the established session.

In addition, when a software and/or firmware version that can overcome detected error is present in the compatibility problem solution database 334, the compatibility manager 331 may transmit a predetermined guide message indicating that the corresponding problem is overcome and then update is provided, to the vehicle Bluetooth device 310 and/or the user device 320 and then transmit the corresponding error information and the device information to an analysis center 360.

Then, when analysis of corresponding error is completed by the analysis center 360 to generate new software and/or firmware version, the compatibility manager 331 may receive the newly generated software and/or firmware from the analysis center 360 and store the newly generated software and/or firmware in the compatibility problem solution database 334. In addition, when a version of the compatibility management app 322 is changed, the compatibility manager 331 may perform control to install the changed compatibility management app in the user device 320.

The compatibility problem processor 332 may receive error information and device information from the compatibility manager 331 and check whether an error type, i.e., error category, corresponding to the received error information is present in the compatibility problem database 333. Then, as the check result, when the corresponding error type is not present, the compatibility problem processor 332 may record the corresponding error type in the compatibility problem database 333.

In addition, the compatibility problem processor 332 may check whether software and/or firmware version to be updated is present based on the error type and device information with reference to the compatibility problem solution database 334. As the check result, when the software and/or firmware version as the update target is present, the compatibility problem processor 332 may read the software and/or firmware version as the update target from the compatibility problem solution database 334 and provide the software and/or firmware version to the compatibility manager 331. In this case, the compatibility manager 331 may perform a predetermined control procedure so as to install the software and/or firmware version as the update target in the corresponding vehicle Bluetooth device 310 and/or user device 320.

The compatibility problem database 333 may record an error type that is pre-collected from the analysis center 360 and an error type that is collected from the vehicle Bluetooth device 310 and/or the user device 320 in real-time. For example, the error type may include, but is not limited to, pairing failure, connection failure, hands-free communication failure, streaming failure, phonebook download failure, A2DP failure, AVRCP failure, message access failure, abnormal connection release, and so on. For example, the pairing failure may correspond to a case in which device registration fails and the connection failure may correspond to a case in which pairing is successful but connection establishment fails.

According to embodiments of the present disclosure, when software and/or firmware to be updated for the vehicle Bluetooth device 310 is present based on the received error information and device information, the compatibility management server 330 may transmit the software and/or firmware to be updated for the vehicle Bluetooth device 310 to the user device 320 through the wireless communication network 340. In this case, a mobile communication module may not be installed in the vehicle Bluetooth device 310 or the installed mobile communication module may not be activated. Continuously, it is noted that the user device 320 may transmit the software and/or firmware as the update target of the vehicle Bluetooth device 310, received from the compatibility management server 330, to the vehicle Bluetooth device 310 using a predetermined Bluetooth communication protocol.

Figure 4:
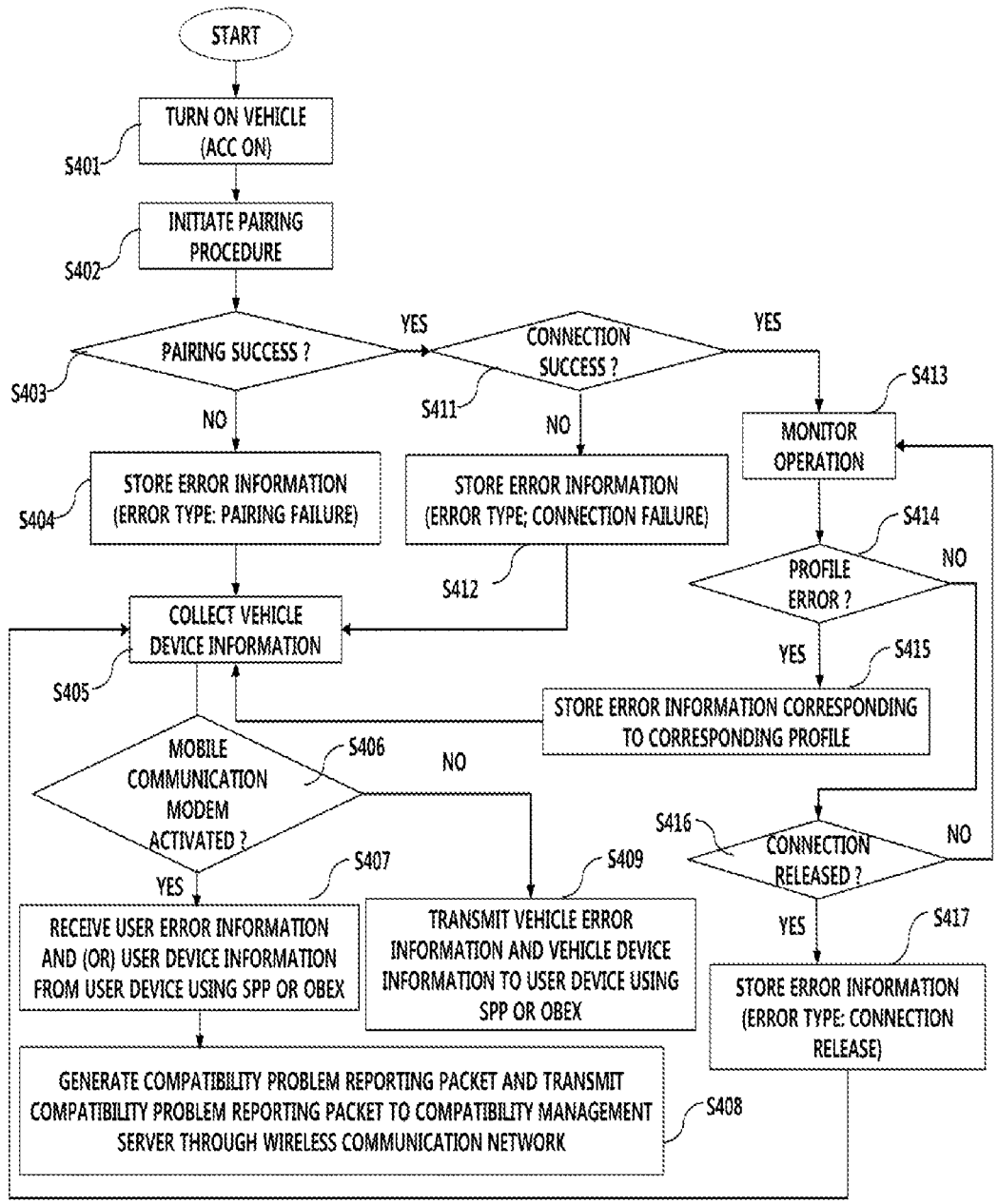
FIG. 4 is a flowchart for explanation of a method for resolving a Bluetooth compatibility problem in a vehicle Bluetooth device according to embodiments of the present disclosure.

FIG. 4 is a flowchart for explanation of a method for resolving a Bluetooth compatibility problem in a vehicle Bluetooth device according to embodiments of the present disclosure.

As shown in FIG. 4, when a vehicle is turned on, the vehicle Bluetooth device may initiate a Bluetooth pairing procedure (S401 to S402).

When the Bluetooth pairing procedure is not successfully completed, the vehicle Bluetooth device may set an error type as pairing failure and store the error information in a predetermined recording region (S403 to S404).

The vehicle Bluetooth device may collect vehicle device information (S405) and then check whether a mobile communication modem is activated (S406). Some vehicle may be installed with a mobile communication modem for providing a telematics communication service and/or a mobile communication service but other some vehicle models may not be installed with the corresponding mobile communication modem. Accordingly, when a mobile communication modem is not installed in a vehicle Bluetooth device, the vehicle Bluetooth device may determine that the mobile communication modem is not activated.

Upon determining that the mobile communication modem is not activated, the vehicle Bluetooth device may receive user error information and/or user device information from a user device using a Bluetooth communication protocol such as SPP or OBEX (S407). Continuously, the vehicle Bluetooth device may generate a compatibility problem reporting packet containing the error information and the device information and transmit the compatibility problem reporting packet to a compatibility management server through an accessed wireless communication network (S408). In this case, the vehicle Bluetooth device may combine the error information and vehicle device information stored in operations 404 and 405 with the user error information and user device information received from the user device to generate the compatibility problem reporting packet.

In operation 406 above, when the mobile communication modem is not activated, the vehicle Bluetooth device may transmit vehicle error information and vehicle device information to a user device using a Bluetooth communication protocol such as SPP or OBEX (S409). In this case, the user device may generate the compatibility problem reporting packet based on vehicle error information, vehicle device information, user device information, and so on and transmit the generated compatibility problem reporting packet to a compatibility management server using a mobile communication module included in the user device.

In operation 403 above, when the Bluetooth pairing procedure is successful, the vehicle Bluetooth device may check whether session establishment with the corresponding user device is successful (S411).

As the check result, when session establishment fails, the vehicle Bluetooth device may store error information indicating that an error type is connection failure and enter operation 405 above (S412).

As the check result of operation 411 above, when connection establishment is successful, the vehicle Bluetooth device may monitor a Bluetooth communication operation (S413). In this case, the vehicle Bluetooth device may provide various profiles or services according to a request of a user device.

As the monitoring result, upon detecting error from a proceeding service or profile, the vehicle Bluetooth device may store error information corresponding to the corresponding service or profile and enter operation 405 above (S414 to S415).

When error is not detected from a currently proceeding service or profile in operation 414 above and Bluetooth communication connection is abnormally released, the vehicle Bluetooth device may set an error type as connection release, store error information and then enter operation 405 above (S416 to S417).

Figure 5:
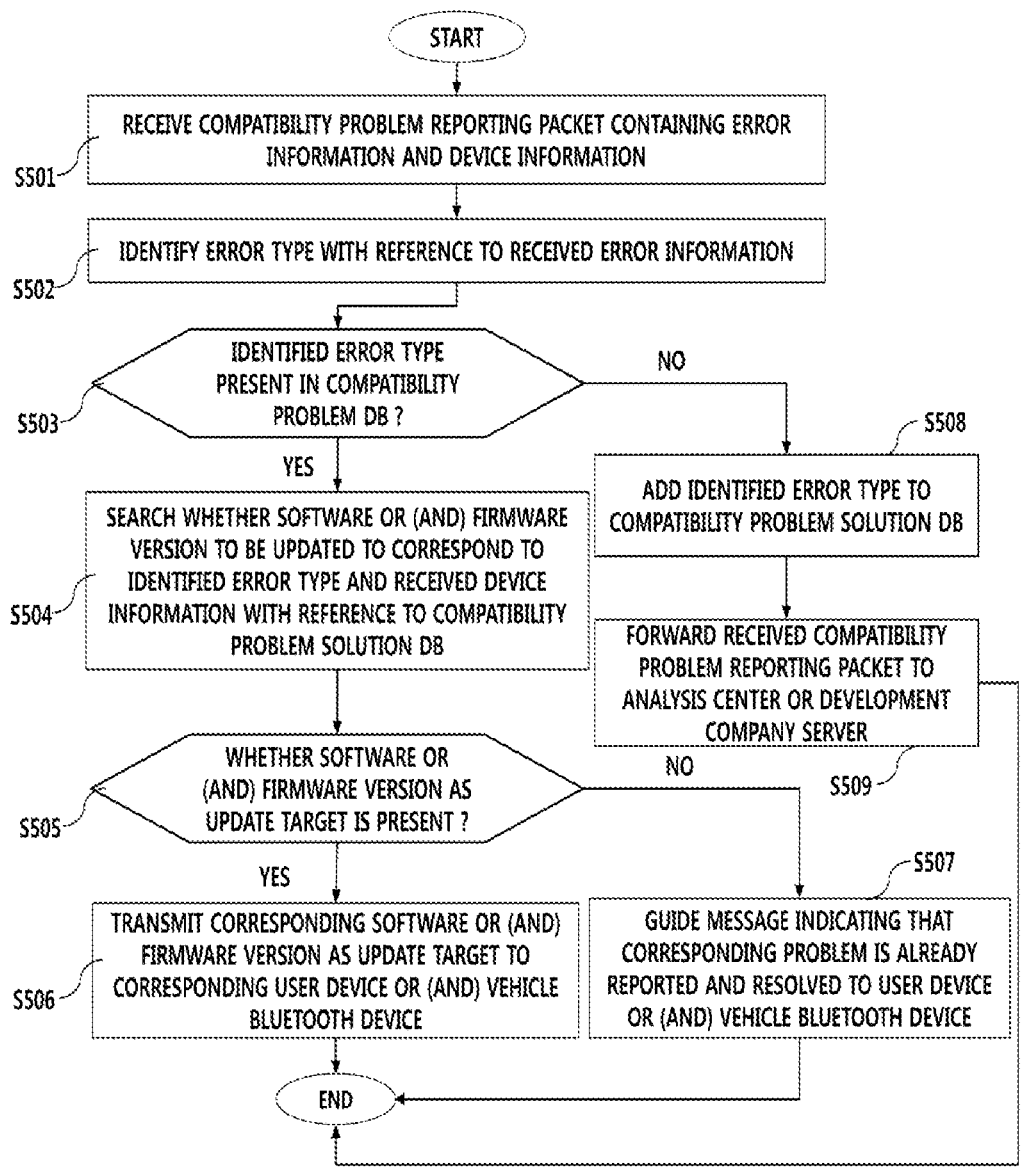
FIG. 5 is a diagram for explanation of a method for resolving a Bluetooth compatibility problem in a compatibility management server, according to embodiments of the present disclosure.

FIG. 5 is a diagram for explanation of a method for resolving a Bluetooth compatibility problem in a compatibility management server, according to embodiments of the present disclosure.

As shown in FIG. 5, the compatibility management server may receive a predetermined compatibility problem reporting packet containing error information and device information from a vehicle Bluetooth device or a user device (S501).

The compatibility management server may identify an error type with reference to the received error information and check whether the identified error type is present in a compatibility problem database (S502 to S503).

As the check result, when the identified error type is present in the compatibility problem database, the compatibility management server may search whether software and/or firmware version to be updated to correspond to the identified error type and received device information is present with reference to a compatibility problem solution database (S504).

As the search result, when the software and/or firmware version as the update target is present, the compatibility management server may transmit the corresponding software and/or firmware version as the update target to a corresponding user device and (or) vehicle Bluetooth device (S505 to S506).

When in operation 505 above, when the software and/or firmware version as the update target is present, the compatibility management server may generate a predetermined guide message indicating that a corresponding problem is already reported and resolved and transmit the guide message to the user device and/or the vehicle Bluetooth device (S507).

In operation 503 above, when an identified error type is not present in the compatibility problem database, the compatibility management server may add the identified error type to the compatibility problem database and forward the received compatibility problem reporting packet to an analysis center or a development company server (S508 to S509).

The method and apparatus according to the present disclosure may have the following advantages.

The present disclosure is advantageous to provide a method and apparatus for resolving a Bluetooth compatibility problem.

The present disclosure is advantageous to provide a method and apparatus for resolving a Bluetooth compatibility problem, for enabling real-time correspondence according to reason analysis by transmitting information about a detected Bluetooth compatibility problem to a server in real-time through a vehicle H/U or a user device when the Bluetooth compatibility problem in a vehicle is detected. In addition, the present disclosure is also advantageous to minimize a number of times of visiting an offline service center for Bluetooth related problems to more rapidly analyze and resolve a Bluetooth compatibility problem as well as to reduce maintenance costs, thereby minimizing user dissatisfaction.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method for resolving a Bluetooth compatibility problem in a vehicle Bluetooth device, the method comprising:
   Bluetooth-connecting with a user device;
   detecting an error during Bluetooth communication with the user device;
   storing vehicle error information for identifying a type of the error detected during Bluetooth communication with the user device;
   collecting vehicle device information for identifying the vehicle Bluetooth device;
   determining whether a mobile communication modem is installed in the vehicle Bluetooth device based on the vehicle device information;
   generating a packet including the vehicle error information and the vehicle device information;
   transmitting the packet to a compatibility management server through a mobile communication module when the mobile communication modem is installed in the vehicle Bluetooth device;
   transmitting the vehicle error information and the vehicle device information to the user device through a predetermined Bluetooth communication protocol when the mobile communication modem is not installed in the vehicle Bluetooth device;
   receiving a software or firmware version to be updated based on the vehicle error information and the vehicle device information from the compatibility management server;
   installing the software or firmware version;
   receiving user error information and/or user device information from the user device before generating the packet; and
   combining the user error information and/or the user device information with the vehicle error information and the vehicle device information,
   wherein the packet is generated based on the user error information and/or the user device information, the vehicle error information, and the vehicle device information.

2. The method according to claim 1, wherein the Bluetooth-connecting comprises:
   Bluetooth-pairing with the user device;
   establishing a Bluetooth communication session with the user device when the Bluetooth pairing is successful; and
   identifying the detected error according to the error type.

3. The method according to claim 2, wherein the Bluetooth-pairing is initiated when a vehicle is turned on.

4. The method according to claim 1, wherein the predetermined Bluetooth communication protocol is any one of a serial port profile and an object exchange profile.

5. The method according to claim 1, further comprising:
   mapping the vehicle error information and the vehicle device information to a device information service packet format defined in Bluetooth standard when the packet is transmitted to the user device.

6. The method according to claim 1, further comprising:
   monitoring a Bluetooth operation when the error is not detected during the Bluetooth-connecting,
   wherein, when an error is detected during the monitoring of the Bluetooth operation, vehicle error information including an error type corresponding to a currently proceeding service or profile and the vehicle device information is transmitted to the compatibility management server or the user device.

7. The method according to claim 6, wherein, when the Bluetooth connection established with the user device is abnormally released during the monitoring of the Bluetooth operation, the vehicle error information formed by setting the error type as connection release and the vehicle device information are transmitted to the compatibility management server or the user device.

8. The method according to claim 1, wherein the user error information and/or the user device information is received from the user device using a serial port profile and an object exchange profile.

9. A vehicle Bluetooth device for performing Bluetooth communication with a user device, the vehicle Bluetooth device comprising:
   a Bluetooth module Bluetooth-communicating with the user device;
   a mobile communication module communicating with a compatibility management server through a wireless communication network; and
   a compatibility diagnosis module performing control to detect an error during Bluetooth communication with the user device, store vehicle error information for identifying a type of the error detected during Bluetooth communication with the user device, collect vehicle device information for identifying the vehicle Bluetooth device, determine whether a mobile communication modem is installed in the vehicle Bluetooth device based on the vehicle device information, and generate a packet including the vehicle error information and the vehicle device information, wherein the compatibility diagnosis module transmits the packet to a compatibility management server through the mobile communication module when the mobile communication modem is activated, the compatibility diagnosis module transmits the vehicle error information and the vehicle device information to the user device through a predetermined Bluetooth communication protocol when the mobile communication modem is not activated the compatibility diagnosis module receives a software or firmware version to be updated based on the vehicle error information and the vehicle device information from the compatibility management server or the user device and installs the software or firmware version, the compatibility diagnosis module receives user error information and/or user device information from the user device before generating the packet, and combines the user error information and/or the user device information with the vehicle error information and the vehicle device information, and the packet is generated based on the user error information and/or the user device information, the vehicle error information, and the vehicle device information.

10. A vehicle Bluetooth device according to claim 9, wherein the predetermined Bluetooth communication protocol is a serial port profile or an object exchange profile.

11. A vehicle Bluetooth device according to claim 9, wherein:
   the compatibility diagnosis module performs to monitor a Bluetooth operation for providing profiles or services when the error is not detected during the Bluetooth-connecting and a connection establishment with the user device is successful, and
   the compatibility diagnosis module performs control to transmit vehicle error information including an error type corresponding to a currently proceeding service or profile and the vehicle device information to the compatibility management server or the user device when an error is detected during the monitoring of the Bluetooth operation.

12. A vehicle Bluetooth device according to claim 11, wherein, when the connection establishment with the user device is abnormally released during the monitoring of the Bluetooth operation, the compatibility diagnosis performs control to transmit the vehicle error information formed by setting the error type as connection release and the vehicle device information to the compatibility management server or the user device.

13. A vehicle Bluetooth device according to claim 9, wherein the user error information and/or the user device information is received from the user device using a serial port profile and an object exchange profile.

* * * * *